(No Model.)

A. DE WITT.
MACHINE FOR SPLICING FENCE WIRE.

No. 393,423. Patented Nov. 27, 1888.

Witnesses:
M. P. Smith.
C. M. Stiles.

Inventor:
Alvin DeWitt,
By Thomas G. Orwig, Atty.

UNITED STATES PATENT OFFICE.

ALVIN DE WITT, OF ELLIOTT, IOWA.

MACHINE FOR SPLICING FENCE-WIRE.

SPECIFICATION forming part of Letters Patent No. 393,423, dated November 27, 1888.

Application filed August 9, 1888. Serial No. 282,359. (No model.)

*To all whom it may concern:*

Be it known that I, ALVIN DE WITT, a citizen of the United States of America, and a resident of Elliott, in the county of Montgomery and State of Iowa, have invented a new and useful Machine for Splicing Fence-Wire, of which the following is a specification.

My object is to provide a portable apparatus that can be readily attached to the machine for making wire fence for which United States Letters Patent were issued to me October 23, 1888, No. 391,404, and also readily detached and fixed in the ground and operated to splice plain or barbed wire.

My invention consists in the construction and joint operation of a wire-holding device and a wire-coiling device, as hereinafter set forth, pointed out in my claim, and illustrated in the accompanying drawings, in which—

Figure 1:
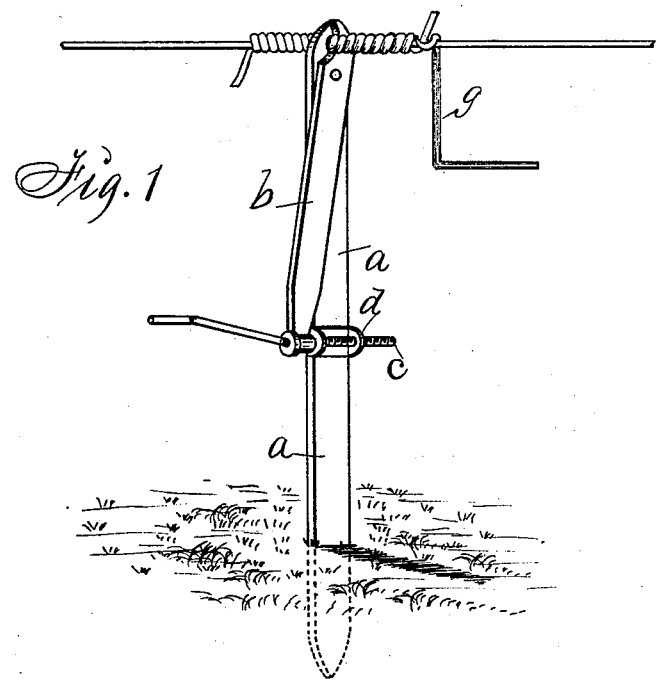
Figure 3:
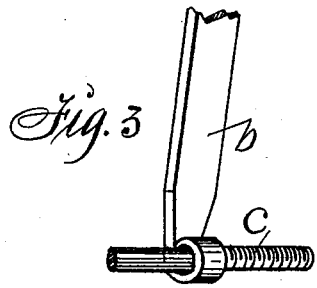
Figure 2:
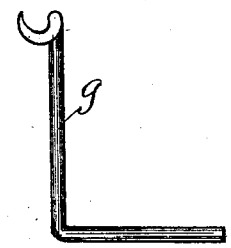

Figure 1 is a perspective view showing the complete apparatus in position as required for practical use. Fig. 2 is a perspective view of the wire-coiling device separated from the wire-holding device. Fig. 3 is an enlarged section of the lower end of the bar, which serves as a bearing for the jaw-operating screw.

$a$ is a straight metal bar that has a hook-shaped jaw at its top end and a pointed lower end adapting it to be set in the ground.

$b$ is a shorter bar that has a corresponding jaw at its top end and an eye or shaft bearing at its lower end. These jaws $a$ and $b$ are pivoted together in such a manner that they will be opened and closed by the movement of the lower end of the short bar $b$.

$c$ is a screw that extends through the eye of the short bar $b$ and a screw threaded bearing, $d$, fixed to the long bar $a$ in such a manner that the jaws can be operated by means of the screw, as required, to clasp and unclasp the overlapping ends of wires extended in opposite directions between the jaws.

$g$ is an elbow-shaped iron rod provided with a hook on its end that is adapted to engage one of the wires in such a manner that the wire will serve as a pivot, while the outer portion of the hook engages the overlapping end portion of the other wire and carries it around the pivot wire, as required, to produce a splice of common form. The hook consists of two bights that extend at right angles to each other.

I claim as my invention—

A wire-holding device comprising the bar $a$, having a jaw at its top end, the bar $b$, having a corresponding jaw at its top end and an eye at its lower end, threaded bearings at the central part of the bar $a$, and a screw, $c$, extended through the eye of the bar $b$ and the threaded bearings on the bar $a$, constructed and combined to operate in the manner set forth.

ALVIN DE WITT.

Witnesses:
 J. H. PETTY,
 B. F. CRAIG.